US005249129A

United States Patent [19]

Lamoureux et al.

[11] Patent Number: 5,249,129
[45] Date of Patent: Sep. 28, 1993

[54] METHOD AND SYSTEM FOR DISPENSING PRECISE AMOUNT OF FLUID WITH AUTOMATIC SET RESET

[76] Inventors: Alain Lamoureux, 12569 d'Allembert, Montreal, Quebec, Canada, H1C 2C4; Mario Beaupré, 3659 Julio, Laval, Quebec, Canada, H7P 4Z9

[21] Appl. No.: 658,883
[22] Filed: Feb. 22, 1991
[51] Int. Cl.[5] .......................... G06F 15/46; B67D 5/30
[52] U.S. Cl. .................................... 364/479; 364/465; 222/14
[58] Field of Search ............... 364/479, 465, 509, 510; 222/26, 14

[56] References Cited

U.S. PATENT DOCUMENTS

| | | | |
|---|---|---|---|
| 3,935,435 | 1/1976 | Greenwood | 364/510 |
| 4,107,777 | 8/1978 | Pearson et al. | 364/465 |
| 4,247,899 | 1/1981 | Schiller et al. | 364/465 |
| 4,572,405 | 2/1986 | Miura | 364/479 |
| 4,595,122 | 6/1986 | Yoshida et al. | 364/479 |

*Primary Examiner*—Jerry Smith
*Assistant Examiner*—Paul Gordon

[57] ABSTRACT

A method and an automatic control system for dispensing a desired precise amount of a fluid from a reservoir by automatic control of a pump. The fluid is discharged through an operator actuable dispensing mechanism which is operated by a user. More particularly, but not exclusively, the system is associated with a gas pump apparatus. The system detects a slow-down or a stoppage in the discharge of the fluid by sensing a signal at the output of a counter which is provided with the gas pump. These signals actuate the controls circuit to sense parameters of the counter whereby to initiate a slow rate of discharge of the fluid from the pump during a predetermined time period before a preset integral amount and after the slow-down or after the reactivation of the actuable dispensing mechanism if a stoppage of the mechanism was detected. After the integral amount is reached, the pump is shut off during a shut off period of time after which shut off period of time, the pump is re-activatable by actuation of the actuable dispensing mechanism. Accordingly, this system greatly facilitates the dispensing of a precise volumeric or cost amount of a fluid, such as gasoline.

13 Claims, 4 Drawing Sheets

| DEFINITION OF VARIABLES | |
|---|---|
| MT | = AMOUNT ON PUMP'S METER |
| MB | = STARTING AMOUNT FOR SYSTEM LOGIC |
| MODE | = DETECTION MODE<br>1-NO PULSE<br>2-SLOW PULSE<br>3-SLOW AND NO PULSE |
| PUL | = PULSE FROM PUMP'S METER |
| AR | = TWO LAST DIGITS TO STOP ON |
| SL | = TWO LAST DIGITS TO STOP ON |
| TIME | = TIME PERIOD WHEN THE PUMP IS STOPPED |
| T | = COUNTER |

METHOD AND SYSTEM FOR DISPENSING PRECISE AMOUNT OF FLUID WITH AUTOMATIC SET RESET

BACKGROUND OF INVENTION

1. Field of the Invention

The present invention relates to a method and a control system for dispensing a desired precise amount of a fluid, such as gasoline, by the user of the actuable dispensing mechanism usually associated with the dispensing nozzle of a fluid pump.

2. Description of Prior Art

Various control systems have been developed whereby to control the dispensing of precise dollar amount of fluids from a gas pump. A most common one of these systems, is the one where the pump is only actuable from a central control system so that the intended user of the pump must firstly pay a predetermined amount of dollars for gasoline that he wishes to dispense in his vehicle. Accordingly, the user must firstly go to the control booth associated with a gas station and pay a desired amount of dollars and indicating to the controller which pump he will be utilizing. The user must then return to the pump and actuate the control lever of the gas nozzle and the pump will automatically dispense the exact dollar value paid into the reservoir of the vehicle. Some of the problems caused by such control system, is that often, the dollar amount paid for may not be fully dispensed into the vehicle reservoir as the reservoir becomes filled prior to having dispense the amount of fuel paid for. Accordingly, the user must returned to the control booth to collect the balance of his payment or else drive off having paid more for the gasoline used. Another disadvantage, is that the reservoir of the vehicle often is not filled to capacity by the dollar amount paid as the user does not have full control of the dispensing.

Another problem with automatic fluid dispensing devices of the prior art, is that if the user wishes to place a predetermined dollar value of gasoline in his vehicle, it is very difficult for him to stop the dispensing valve of the nozzle on a precise dollar value as the meter display runs too fast due to the fast flow rates at the dispensing valve. In order to try and solve this problem, various other control systems have been devised such as disclosed in U.S. Pat. No. 4,572,405 or in U.S. Pat. No. 4,254,328. A disadvantage of these systems as disclosed in these patents, is that these systems cannot be adapted to existing gas pumps and still the operator must preset a desired volumeric or dollar amount value in a control computer associated with the pump, and the pump will shut off once that value is attained. The user must then pay the amount stored before he can re-activate the pump. Again, we are then faced with the same problems as above described in having to reset the computer or having to fill the vehicle reservoir to its full capacity. Also, with these systems, the operator must read and comprehend instructions on how to utilize the system and this can be troublesome to certain intended users.

SUMMARY OF INVENTION

It is therefore a feature of the present invention to provide a method and an automatic control system for dispensing a desired precise amount of a fluid, such as gasoline, and which substantially overcomes all of the above-mentioned disadvantages of the prior art.

It is a further feature of the present invention to provide a method and an automatic control system for dispensing a desired precise amount of a fluid, such as gasoline, and wherein it is not necessary for the user to pre-program a desired volumeric or dollar amount of the fluid to be dispensed in order for the user to dispense a desired precise amount in the reservoir of his vehicle.

It is a still further feature of the present invention to provide a method and an automatic control system for dispensing a desired precise amount of a fluid, such as gasoline, and which is adaptable to existing gas pump systems.

Another feature of the present invention is to provide a method and an automatic control system for dispensing a desired precise amount of a fluid, such as gasoline, and wherein the system is fully automatic and capable of slowing down the discharge of fluid for predetermined periods of time, which is capable of shutting off the pump for predetermined period of times and which can automatically reactuate the pump to permit the user to exceed a first desired quantity of fluid being dispensed and to achieve further desired quantities.

According to the above features, from a broad aspect, the present invention provides a method of dispensing a desired precise amount of a fluid from a reservoir by automatic control of a pump, and wherein the fluid is discharged through an operator actuable dispensing mechanism operated by a user. The method comprises automatically detecting a slow-down or a stoppage in the discharge of the fluid through the dispensing mechanism. The rate of discharge of the fluid from the pump is then slowed down during a predetermined time period before a preset integral amount and after the slow-down is detected or after a reactivation of the actuable dispensing mechanism if a stoppage thereof was detected. The pump is then shut off after the integral amount is reached and maintained shut off during a shut off period of time after which shut off period of time, the pump is reactivatable by actuation of the actuable dispensing mechanism.

According to a still further broad aspect of the present invention, there is provided an automatic control system for dispensing a desired precise amount of a fluid, by means of a pump, from a reservoir to a dispensing element having an orifice and provided with an operator actuable dispensing mechanism to actuate the pump and control the rate of discharge of the fluid through the orifice. The system is provided with control means to permit dispensing a desired precise amount of the fluid by an operator and has detection means to detect a slow-down or a stoppage in the rate of discharge as controlled by an operator of the actuable dispensing mechanism. The control means has rate discharge control means for slowing the rate of discharge of the fluid by the pump during a predetermined time period before a preset integral amount is reached and after the slow-down is selected or after a reactivation of the actuable dispensing mechanism, if a stoppage thereof was detected. After the integral amount is reached, the control means shuts off the pump for a predetermined shut off period of time and after which shut off period of time, the pump is automatically placed in a reactivatable mode for actuation by the actuable dispensing mechanism.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
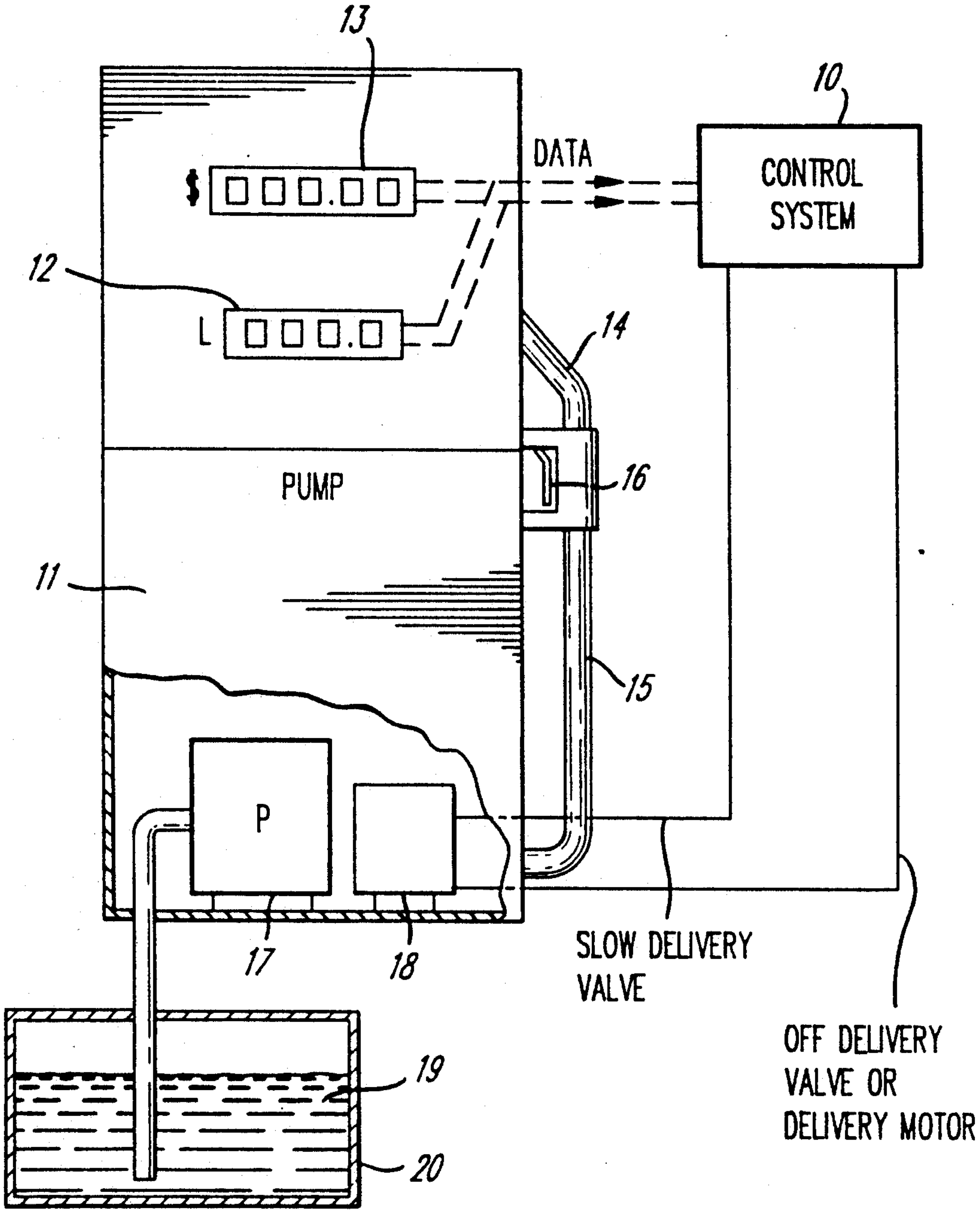
FIG. 1 is a schematic view illustrating a gas pump with the control system of the present invention associated therewith.
Figure 2:
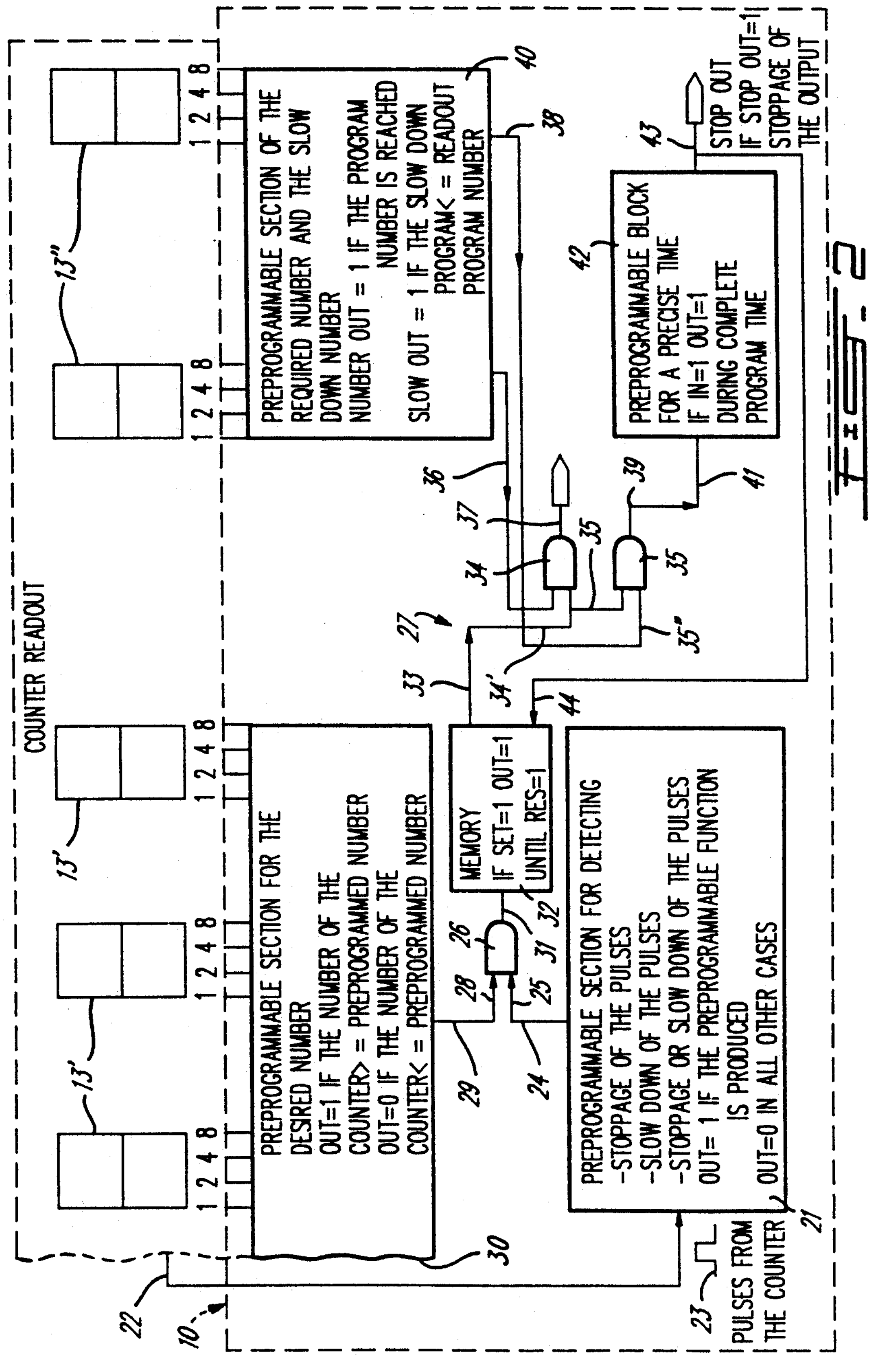
FIG. 2 is a schematic block diagram showing the construction of the automatic control system of the present invention.

Referring now to the drawings, and more particularly to FIGS. 1 and 2, there is shown generally at 10, the automatic control system of the present invention, associated with a gas pump 11 and more particularly, with one of the meters 12 or 13 indicative of a volumeric quantity or dollar quantity, respectively, of fluid being dispense through the dispensing nozzle 14 of the hose 15 associated with the pump 11. An operator, hand-actuable dispensing mechanism 16 is associated with the dispensing nozzle 14 to control a dispensing valve (not shown) or the actuation of a pump 17 located inside the gas pump housing 11, as is common in the prior art. The pump 17 is usually provided with a dispensing rate control circuit which is responsive to the actuation of the dispensing mechanism 16 whereby to place the pump 17 in a desired mode of operation to dispense the gasoline 19 from the reservoir 20 usually stored in a large reservoir in the ground near the pump housing 11.

Referring now to FIG. 2, there will be described the construction of the automatic control system of the present invention. Essentially, the automatic control system is a control means 10 which may be constructed as an electronic control logic circuit or may be comprised by a micro-processor circuit which is controlled by a program to effectuate the functions of the control means as will be described later with the flow charts of FIGS. 3A and 3B. The control circuit 10 as herein illustrated, consists of a pulse rate detector 21 which is programmable or presetable by the proprietor. The detector constitutes a detection means and is connected to the output 22 of the meter counter 12 or 13, where there is generated pulses 23 at a frequency related to the rate of discharge of the gasoline through the dispensing nozzle 14. The pulse rate detector 21 provides information signals on its output 24, which signals are representative of a slow-down in the frequency or pulse rate generated at the output 22 of the meter or a complete shut off of the pulse rate. The detector can be preset to any one of the two modes or the combination as illustrated at 51, 53 and 54 in FIG. 3A. These information signals on the output 24 are fed to an input 25 of a first logic gate 26 of a verification circuit 27. As herein shown, the verification circuit 27 is comprised of logic gates.

The gate 26 as a further input 28, which is associated with the output 29 of a programmable circuit 30 which is associated with the display circuits 13' of the counter 13. The programmable circuit 30 permits the read out counter 13 to be pre-programmed by the pump installer, and not the customer user of the pump, to a desired dollar integral value. The programmed circuit 30 also has a built-in detector which senses the actual dollar value indicated on the displays 13' and generates an output logic signal "1" if the actual number is greater than the programmed numbers stored in the program circuit 30. It generates a "0" digital value if the actual number on the display 13' is smaller than the programmed number. These logic signals are fed to the input 28 of the gate 26, as previously described. The output 31 of the gate 26 feed a memory circuit 32 which has an output 33 which feeds an input 34' of gate 34 and input 35' of gate 35. It is pointed out that the program circuit 30 is also programmable to activate the logic circuit only after detection of a preset dollar or volume value. Accordingly, there would be no automatic control during an initial phase. This is particularly desirable when dispensing gasoline where often the pump stops automatically when one starts dispensing gasoline, as often the passage leading to the vehicle reservoir "back-up" causing the pump to stop automatically.

Gate 34 is connected to an output 36 of a further programmable circuit 40 associated with the dollar fraction or cents denomination display 13'' of the meter 13. The logic signal at the output 36 provides an information signal to the gate 34 to determine if its output 37 should be changed to provide a signal to the dispensing rate control 18 of the pump 17 to slow down the discharge rate of the fluid 19 from the reservoir 20 to the dispensing nozzle 14. The programmable circuit 40 is also provided with a second output 38 which feeds an information signal to the second input 35'' of the gate 35 and it has a logic "1 " on its output when a programmable integral number is reached. For example, the number in the sensed display window 13' can be pre-programmed on, for example, 25 cents value integers or 50 cents integers and once one of these intergers is attained, the output logic signal on output 38 will change to a "1" indicating to the gate that that number has been attained. The "slow out" signal at the output 36 has a logic "1" on its output if the number programmed for the display 13' is smaller than the actual read out value in these indicator windows 13'' and smaller than the programmed number. The pump is slowed down for a predetermined period of time before the integral desired value is reached so as to permit the user to stop the pump on the desired value. If the user, during the predetermined period of time, actuates the dispensing mechanism to its maximum discharge position, it is only after the pump has stopped for the shut-off period of time, (i.e. 1 second) after the slow down period that it will resume normal discharge. The slow mode provides for the pump 17 and motor 18 to be stopped on a precise integral value, such as a zero (0), as the inertia of the pump and motor is slowed down prior to reaching the integral value. Thus, the slow mode is to control the inertia of the pump only. If the pump is provided with a "shut-off" valve inside the pump (not shown), then the slow mode need not be programmed. The user will then be facilitated for stopping on the desired amount due to the shut-off period of time which automatically occurs after the programmed integral value is reached (i.e. the desired value). The user then releases the dispensing mechanism during this shut-off period of time (i.e. 1 or 2 seconds).

The output 39 of gate 35 feeds the input 41 of a programmable timer circuit 42. The programmable timer circuit 42 permits the pre-setting of the desired shut off period of time for the pump once the program integral integer has been detected. If the input 41 of the timer circuit 42 is a logic "1", the output 43 is also logic "1" and this will stop the pump 17 and thereby stop the discharge of fluid through the dispensing nozzle. After the predetermined programmed time period has been reached in the timer circuit, the output logic signal will revert to a "0", thus providing a reset signal on the input 44 of the memory circuit 32 to automatically place the system and the pump, in a reactivatable mode, thereby permitting the user to dispense further gasoline by actuating or simply maintaining the hand operable lever or dispensing mechanism 16 in a "on" position.

Summarizing the method of operation of the automatic dispensing system of the present invention, it can be seen that when an operator using the dispensing nozzle, is approaching a desired volumeric or dollar value which is visually indicated to him by the meters 12 or 13 on the pump housing 11, he will start releasing the dispensing handle or mechanism 16 associated with the dispensing nozzle 14, and the system will automatically detect this slow-down or stoppage if the lever is released completely, indicating to the system that the user is approaching its desired requirements. The system will then automatically place the pump in a slower rate of discharge of the fluid immediately upon reaching a programmed integer, such as 10 cents or 15 cents integer, prior to a preset integral amount (i.e. 00), so as to slow the pump not to exceed the preset amount, so that the user can stop the dispensing on a precise desired value. The pump also stops for a shut-off period of time (i.e. 1 second), upon reaching the desired integral amount to give the user time to release the dispensing mechanism. After the shut-off time, the system is reset to its normal operation whereby the operator can then continue to dispense gasoline at a high rate as dictated by the position of the handle of the dispensing mechanism 16 and then the system can again go into a slow mode automatically if the operator starts releasing the discharge mechanism 16. Accordingly, the system provides for the user to attain any precise desired monetary or volumeric value of fluid being dispensed. If the slow mode is not programmed, then the shut-off period after the integral value is reached assisting the operator to stop, on that value.

Figure 3A:
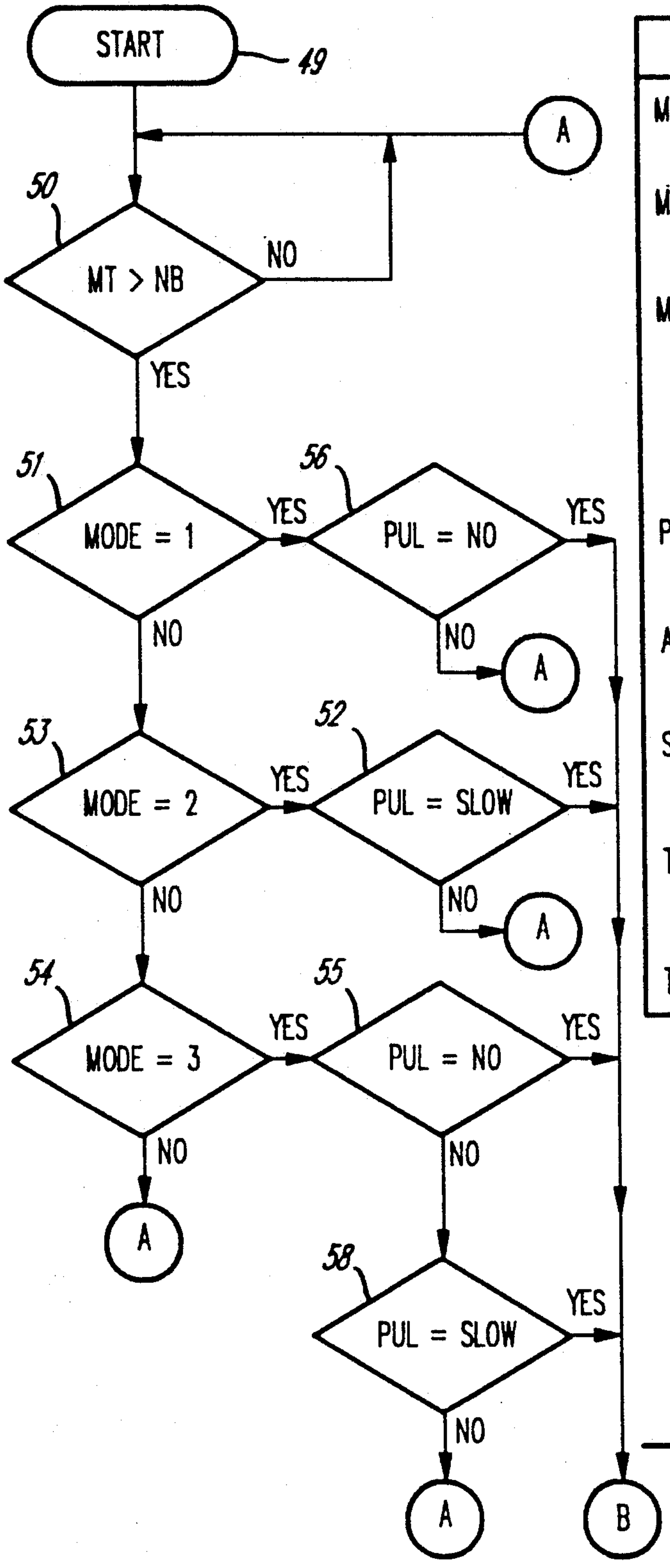
FIGS. 3A and 3B are flow charts illustrating the operation of the logic of the control circuit of the present invention.
Figure 3B:
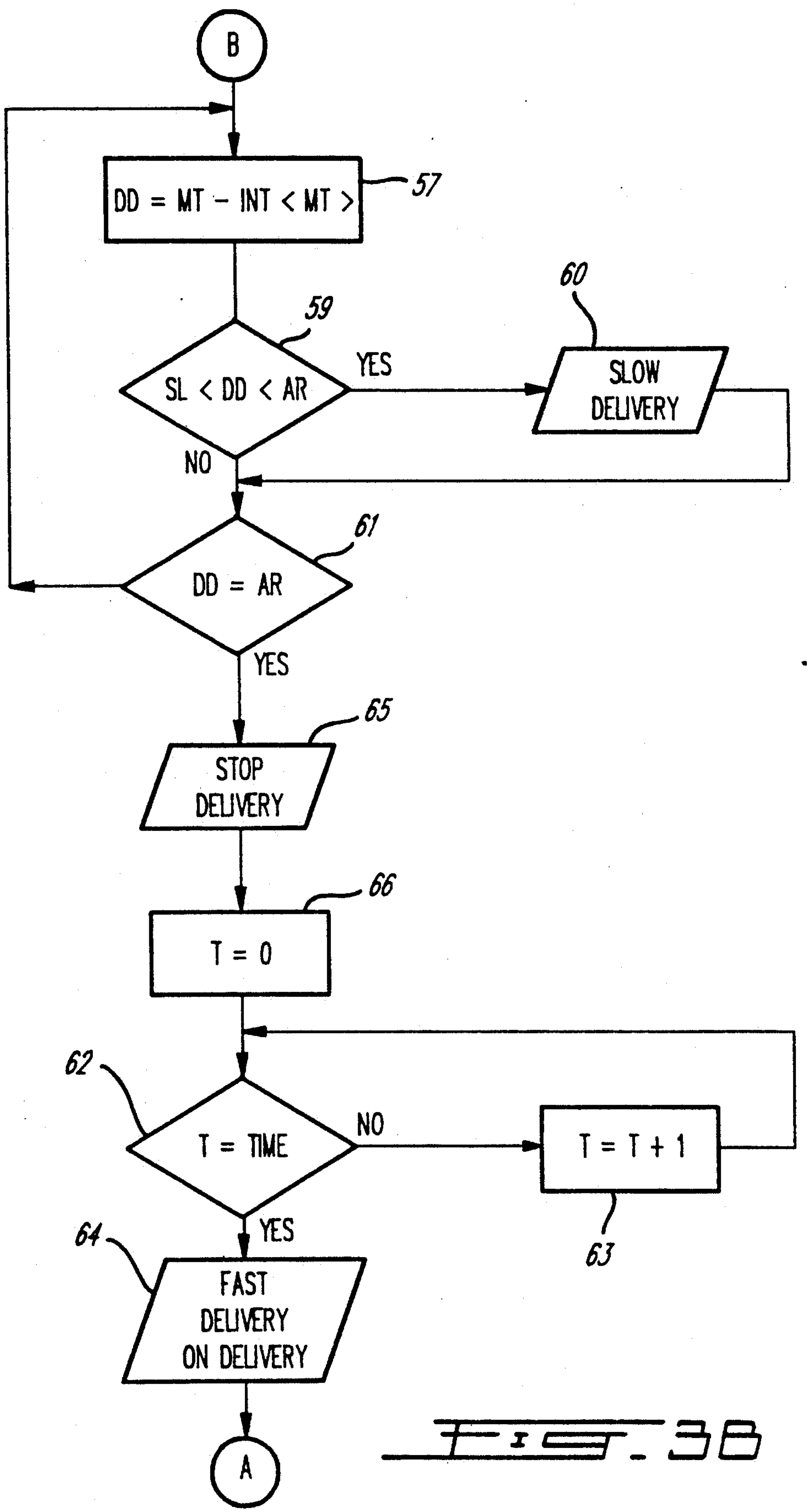

Referring now to FIGS. 3A and 3B, there is shown a logic flow chart which implements the method of operation of the present invention by a micro-processor circuit. As herein shown, logic step 50 detects if the amount of the meter exceeds the starting amount preset to initiate the system logic. If the value on the counter is greater than the pre-programmed starting amount, the system is operative. It detects if step 51, 53 or 54 is preset. Step 51 represents mode 1 which is the mode of detecting the stoppages of the pulses, only. If this step is preset, then step 56 verifies if there are pulses on its output. If yes, it goes to step 57. If no, it reverts to step 50. Step 53 represents mode 2 which is the slow pulse detection. If preset, step 52 goes to step 57. If not it reverts to step 50. Step 54 represents the combined modes of steps 51 and 53. If preset, step 55 will verify if the pulsations have stopped. If they have stopped, it goes to step 57, if not, it verifies if pulsations are slow. If they are slow, it goes to step 57 and if not, it reverts to step 50. Step 57 passes the last two digits of the counter in the variable "DD" by the equation shown. Step 59 verifies if the variable "DD" is greater than the pre-programmed amount set in the programming circuit 40, which is necessary to initiate the slow-down in the rate of discharge of the gasoline and if it is smaller than the next integral quantity. If yes, then we pass to step 60 which is the slow delivery mode. If no, then we pass to step 61 and back to the input of step 57. If the integral amount has been reached (preset integral value), and after the slow delivery mode, the pump is stopped, as indicative by step 65. Thereafter, the counter 42 is reset automatically to zero as indicative by step 61. Step 62 indicates a test to determine if the value of the timer is equal to the timer preset value. Step 63 increments the counter by one to effectuate this test as is representative by block 63. After the predetermined time period, the pump is placed back to its normal mode of operation as indicated at step 64.

It is within the ambit of the present invention to cover any obvious modifications of the preferred embodiment described herein, provided such modifications fall within the scope of the appended claims. For example, as previously described, the control system of the present invention can be implemented by a logic electronic circuit as described herein or by implementing the program in a micro-processor associated with the dispensing rate control circuit of the pump. Alternatively, a new micro-processor circuit may be adapted to existing pumps and programmed to implement the novel dispensing method of the present invention.

We claim:

1. A method of dispensing a desired precise amount of a fluid from a reservoir by an operator controlling the operation of a pump, and wherein said fluid is discharged and controlled by an operator through an actuable dispensing mechanism operated by said operator at said pump, said method comprising:

i) automatically detecting a slow-down or a stoppage in said discharge of said fluid through said dispensing mechanism as controlled by an operator.

ii) slowing the rate of discharge of said fluid from said pump during a predetermined time period before a preset integral amount and after said operator slow-down, or a reactivation of said actuable dispensing mechanism by said operator if a stoppage of said mechanism was detected, and iii) shutting-off said pump after said integral amount for a predetermined shut off period of time and after which shut off period of time, said pump is reactivatable by said operator upon activation of said actuable dispensing mechanism, said steps (ii) and (iii) providing an operator a delayed dispensing action whereby to enable said operator to dispense a precise amount of said fluid.

2. A method as claimed in claim 1 wherein there is further provided the step of pre-setting a control means to establish said predetermined time period and said shut off period of time.

3. A method as claimed in claim 1, wherein said predetermined time period is terminated automatically upon said control means effecting the step of detecting an integral integer representative of a programmed volume or cost numerical value of said fluid.

4. A method as claimed in claim 1, wherein there is further provided display means to display said integer, said display means being a numerical value of said volume or cost value of said fluid dispensed through said dispensing mechanism, said precise amount during said predetermined time period being dispensed automatically provided said actuable dispensing mechanism is actuated.

5. An automatic control system for dispensing a desired precise amount of a fluid, by means of a pump, from a reservoir to a dispensing element having an orifice and provided with an operator actuable dispensing mechanism to actuate said pump and control the rate of discharge of said fluid through said orifice, said system having control means to permit dispensing a desired precise amount of said fluid by an operator and having detection means to detect a slow-down or a stoppage in said rate of discharge as controlled by an operator of said actuable dispensing mechanism, said control means having rate discharge control means for slowing the rate of discharge of said fluid by said pump during a predetermined time period before a preset integral amount and after said slow-down is detected or after a reactivation of said actuable dispensing mechanism, if a stoppage thereof was detected, and after said integral amount shutting off said pump and maintaining said pump shut off for a predetermined shut off period of time and after which shut off period of time said pump is automatically placed in a reactivatable mode for actuation of said actuatable dispensing mechanism.

6. An automatic control system as claimed in claim 5, wherein said detection means comprises a pulse rate detector connected to an output of a meter counter wherein there is generated pulses at a frequency related to the rate of discharge of said fluid, said pulse rate detector providing information signals representative of a slow-down in the pulse rate or a cut off of said pulse rate.

7. An automatic control system as claimed in claim 6, wherein said rate discharge control means includes a verification circuit connected to said pulse rate detector and to a programmable circuit associated with said meter counter, said verification circuit generating control signals to actuate a dispensing rate control circuit associated with said pump to cause a reduction in the rate of discharge of said fluid for said predetermined time period and to shut off said pump.

8. An automatic control system as claimed in claim 7, wherein said programmable circuit is provided with a meter programmable circuit to program a predetermined integer of said meter, said meter programmable circuit generating information signals to said verification circuit associated with said programmed integer wherein said verification circuit will generate control signals upon receipt of predetermined information signals.

9. An automatic control system as claimed in claim 8, wherein said verification circuit has an output connected to a programmable timer circuit to preset a desired shut off period of time for said pump once said programmed integer has been detected, said pump being automatically placed to said reactivatable mode after said desired shut off period of time.

10. An automatic control system as claimed in claim 9, wherein said verification circuit is a logic circuit comprising a plurality of gates which are fed logic information signals from said meter programmable circuit and said pulse rate detector.

11. An automatic control system as claimed in claim 9, wherein said meter counter is constituted by a visual counter associated with a gas pump, said counter indicating a volume quantity of gas being dispensed or a dollar value quantity of said gas being dispensed.

12. An automatic control system as claimed in claim 5, wherein said control means is comprised by a microprocessor circuit controlled by a program to effectuate said functions of said control means.

13. An automatic control system as claimed in claim 5, wherein said control means is comprised by electronic logic circuits.

* * * * *